US009025930B2

(12) United States Patent
Nishino et al.

(10) Patent No.: US 9,025,930 B2
(45) Date of Patent: May 5, 2015

(54) CHAPTER INFORMATION CREATION APPARATUS AND CONTROL METHOD THEREFOR

(75) Inventors: Tadaaki Nishino, Tokyo (JP); Atsushi Mizutome, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 13/043,143

(22) Filed: Mar. 8, 2011

(65) Prior Publication Data
US 2011/0229109 A1      Sep. 22, 2011

(30) Foreign Application Priority Data

Mar. 18, 2010   (JP) ................................ 2010-063244

(51) Int. Cl.
| | |
|---|---|
| H04N 9/80 | (2006.01) |
| H04N 5/765 | (2006.01) |
| H04N 5/781 | (2006.01) |
| H04N 5/85 | (2006.01) |
| H04N 9/82 | (2006.01) |
| H04N 19/30 | (2014.01) |

(52) U.S. Cl.
CPC ............... *H04N 5/765* (2013.01); *H04N 5/781* (2013.01); *H04N 5/85* (2013.01); *H04N 9/8205* (2013.01); *H04N 9/8211* (2013.01); *H04N 19/30* (2013.01)

(58) Field of Classification Search
None
See application file for complete search history.

(56) References Cited

U.S. PATENT DOCUMENTS

| | | | | |
|---|---|---|---|---|
| 6,728,317 | B1 * | 4/2004 | Demos ...................... | 375/240.21 |
| 6,977,664 | B1 * | 12/2005 | Jinzenji et al. ................ | 345/629 |
| 2003/0072375 | A1 * | 4/2003 | Soundararajan ......... | 375/240.25 |
| 2003/0165274 | A1 * | 9/2003 | Haskell et al. ................ | 382/243 |
| 2006/0126962 | A1 * | 6/2006 | Sun ............................... | 382/268 |
| 2006/0177139 | A1 * | 8/2006 | Marcellin et al. ............. | 382/232 |
| 2006/0209959 | A1 * | 9/2006 | Sun .......................... | 375/240.16 |
| 2008/0058100 | A1 * | 3/2008 | Kouno ............................ | 463/31 |

(Continued)

FOREIGN PATENT DOCUMENTS

| | | |
|---|---|---|
| JP | 2006-108729 | 4/2006 |
| JP | 2009-077256 A | 4/2009 |

(Continued)

OTHER PUBLICATIONS

The above foreign patent documents were cited in the Feb. 10, 2014 Japanese Office Action, which is enclosed without an English Translation, that issued in Japanese Patent Application No. 2010-063244.

*Primary Examiner* — Hung Dang
*Assistant Examiner* — Sunghyoun Park
(74) *Attorney, Agent, or Firm* — Cowan, Liebowitz & Latman, P.C.

(57) ABSTRACT

A chapter information creation apparatus calculates, from field-of-view information, a position of a video image having a narrow field of view whose ratio to the size of a field of view of a video image having the widest field of view, among a plurality of hierarchically-encoded video images, is less than or equal to a threshold value. Chapter information is then created if a moved distance over a fixed period is greater than or equal to a threshold value. Chapter information is created for other video images if, based on a result of analyzing the video image having widest field of view, a change in that video image is detected. Chapter information for the video image of each layer included in video image data obtained by hierarchically encoding video images having different fields of view can thereby be created using a simple method.

23 Claims, 5 Drawing Sheets

(56) References Cited

U.S. PATENT DOCUMENTS

2008/0063236 A1* 3/2008 Ikenoue et al. ............... 382/103
2010/0202661 A1* 8/2010 Mizutani ....................... 382/103

FOREIGN PATENT DOCUMENTS

| JP | 2010-045765 A | | 2/2010 |
|----|---------------|---|--------|
| WO | WO2009078056 | * | 7/2009 |

* cited by examiner

CHAPTER INFORMATION CREATION APPARATUS AND CONTROL METHOD THEREFOR

BACKGROUND OF THE INVENTION

1. Field of the Invention

The present invention relates to a chapter information creation apparatus that creates chapter information for video image data and a control method therefor, and more particularly to a chapter information creation apparatus that creates chapter information for video image data obtained by hierarchically encoding video image content and a control method therefor.

2. Description of the Related Art

Heretofore, techniques for detecting scene change positions or the like in video image content that is being recorded or played back, and creating information specifying the detected positions as chapter information are known in video image cameras, broadcast program recording apparatuses and the like. Chapter information is, for example, recorded in the data of video image content, and used in cue playback of video image content, editing and the like.

For example, Japanese Patent Laid-Open No: 2006-108729 discloses a technique for detecting scene changes between frames of video image content from the difference between the frames, and automatically creating chapter information.

As for examples of hierarchical encoding schemes for video image content, on the other hand, H.264/SVC (Scalable Video Coding), which is an enhanced version of H.264/AVC (Advanced Video Coding), has become standardized. Use of a hierarchical encoding scheme enables video image data having a plurality of resolutions to be hierarchized and encoded in the data of a single video image stream. For example, video images having a plurality of resolutions in the same video image content, such as 640×480 pixel SD resolution and 4096×2160 pixel 4K2K resolution, can be hierarchized and encoded in the data of a single stream.

The field of view can also be differentiated between layers, such that a layer in SD resolution is a close-up of a face and a layer in 4K2K resolution is a full body shot.

In the case where scene changes are detected and chapter information is automatically created in a conventional manner with respect to hierarchically-encoded video image content, chapter information can be created at one given layer by applying a conventional scheme and commonly used at all layers if the field of view is the same between layers.

However, in the case of video image content having different fields of view between the layers, there could possibly be a scene change at one layer but not at another layer. For example, consider the case where there is a video image of a scene including a number of people at a high resolution layer and a video image of a close up of one of the people at a low resolution layer. In this case, the video image of the low resolution layer could change to a close up of another person, even though there is not a significant change in the video image at the high resolution layer. Thus, with video image content that has been hierarchically encoded to have different fields of view between encoded layers, chapter information needs to be created for each layer having a different field of view.

For example, in the case where chapter information is created using the method disclosed in Japanese Patent Laid-Open No. 2006-108729, scene changes need to be detected by analyzing video images for each encoded layer having a different field of view, giving rise to the problem of increased processing. In particular, scene analysis of a given layer requires decoding of that layer, leading to an increase in processing over and above the increase in analysis processing.

SUMMARY OF THE INVENTION

The present invention has been made in consideration of such problems with conventional technology. The present invention enables chapter information for the video image of each layer to be created using a simple method, with a chapter information creation apparatus that creates chapter information for video image data obtained by hierarchically encoding video images having different fields of view and a control method therefor.

According to an aspect of the present invention, there is provided a chapter information creation apparatus for creating, from video image data obtained by hierarchically encoding a plurality of video images including a video image having an arbitrary field of view and a video image having a field of view corresponding to a region included in the arbitrary field of view, chapter information for each of the plurality of video images, comprising: determination unit adapted to determine, from information relating to the fields of view of the plurality of video images and included in the video image data, a first video image having a widest field of view from among the plurality of video images included in the video image data; detection unit adapted to detect, from information relating to the fields of view of the plurality of video images and included in the video image data, a second video image having a field of view whose ratio to a size of the field of view of the first video image is less than or equal to a threshold value from among the video images included in the video image data; computation unit adapted to periodically calculate a position of the second video image in a region included in the field of view of the first video image; first creation unit adapted to calculate, from the position periodically calculated by the computation unit with respect to the second video image, a moved distance of the position over a fixed period, and create chapter information for the second video image if the moved distance is greater than or equal to a predetermined threshold; and second creation unit adapted to analyze the first video image, and create chapter information for the first video image and the second video image in response to a change in the first video image being detected.

According to an aspect of the present invention, there is provided a control method for a chapter information creation apparatus that creates, from video image data obtained by hierarchically encoding a plurality of video images including a video image having an arbitrary field of view and a video image having a field of view corresponding to a region included in the arbitrary field of view, chapter information for each of the plurality of video images, comprising: a determination step of determining, from information relating to the fields of view of the plurality of video images and included in the video image data, a first video image having a widest field of view from among the plurality of video images included in the video image data; a detection step of detecting, from information relating to the fields of view of the plurality of video images and included in the video image data, a second video image having a field of view whose ratio to a size of the field of view of the first video image is less than or equal to a threshold value from among the plurality of video images included in the video image data; a computation step of periodically calculating a position of the second video image in a region included in the field of view of the first video image; a first creation step of calculating, from the position periodically calculated in the computation step with respect to the second video image, a moved distance of the position over a fixed period, and creating chapter information for the second video image if the moved distance is greater than or equal to a predetermined threshold; and a second creation step of analyzing the first video image, and creating chapter information for the first video image and the second video image in response to a change in the first video image being detected.

Further features of the present invention will become apparent from the following description of exemplary embodiments with reference to the attached drawings.

DESCRIPTION OF THE EMBODIMENTS

Figure 1:
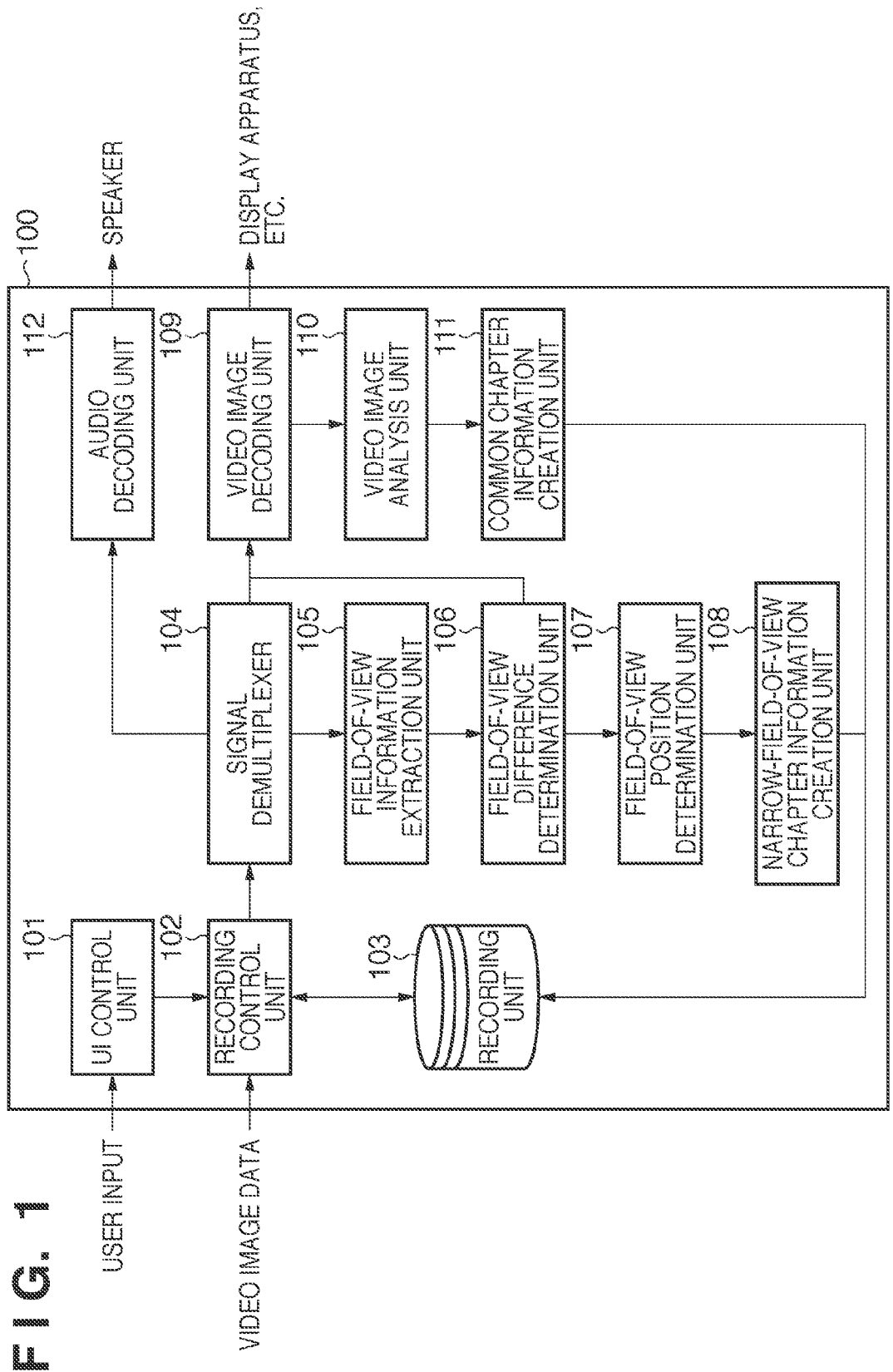
FIG. 1 is a block diagram showing an example configuration of a chapter information creation apparatus according to an embodiment of the present invention.

Exemplary embodiments of the present invention will now be described in detail in accordance with the accompanying drawings. FIG. 1 is a block diagram showing an example configuration of a chapter information creation apparatus 100 according to an embodiment of the present invention. Note that while the chapter information creation apparatus 100 according to the present embodiment will be described as being a recording device, the present invention can be implemented in an arbitrary device capable of decoding hierarchically-encoded video image content. Apart from a recording apparatus such as a video recorder or a video camera, the present invention can be favorably implemented in a playback apparatus for playing back encoded video images stored on a recording medium, such as a video disk player or a media player, or an arbitrary device having similar functions to the recording apparatus or playback apparatus.

In FIG. 1, UI (User Interface) control unit 101 receives a user operation of a key or a button (not shown), and controls a recording control unit 102 based on the received content. The recording control unit 102 records video image content data input from an external source to a recording unit 103, under control of the UI control unit 101.

In the present embodiment, video image data input from an external source is assumed to be stream data in Moving Picture Experts Group 2 Transport Stream (hereinafter, MPEG2 TS) format. Also, video image data is assumed to have audio data and hierarchically-encoded video image data multiplexed therein as an audio elementary stream (hereinafter, audio ES) and a video image elementary stream (hereinafter, video image ES), respectively. Note that the video image ES is assumed to be in H.264/SVC format, for example. Hierarchically-encoded video image data includes a based layer and at least one enhanced layer. If the video image of the base layer and the video images of the one or more enhanced layers have a common field of view, the base layer includes the minimum information required in order to play back video image content, and the one or more enhanced layers include data for improving the quality of the video image of the base layer. In the present embodiment, there are assumed to be video images having different fields of view encoded on at least two layers (which may or may not include the base layer). The video images having different fields of view are assumed to be a video image having the widest field of view and a video image having a field of view corresponding to part of a region of the video image having the widest field of view. Further, in order to facilitate description and comprehension, the spatial resolutions of the video images are assumed to be equivalent between layers.

Note that video image content data received by the recording control unit 102 may be input via any of various types of transmission media such as a broadcast, a recording medium or a network. If video image content data is input using a broadcast, tuning is assumed to have been performed by an upstream tuner (not shown), for example. Alternatively, the recording control unit 102 may have a tuner, and stream data of a specific channel may be extracted by a channel selection instruction from the UI control unit 101.

The recording control unit 102 further outputs video image content data recorded in the recording unit 103 to a signal demultiplexer 104. The recording unit 103 records MPEG2 TS data input from the recording control unit 102 to a storage device such as a hard disk drive, a Blu-ray disk drive or a semiconductor storage device. Further, the recording unit 103 records a chapter information table created by a narrow-field-of-view chapter information creation unit 108 and a common chapter information creation unit 111 (discussed later) in a storage device.

The signal demultiplexer 104 demultiplexes MPEG2 TS data input from the recording control unit 102 into video image ES and audio ES data, and respectively outputs the video image ES data to a video image decoding unit 109 and a field-of-view information extraction unit 105 and the audio ES to an audio decoding unit 112.

The field-of-view information extraction unit 105 extracts field-of-view information on the video image of a hierarchically encoded base layer and field-of-view offset information on the video image of one or more enhanced layers (information on the difference from the field of view of the base layer), from information relating to encoding included in the video image ES input from the signal demultiplexer 104. The field-of-view information thus includes the field-of-view information of the video image of a specific layer called the base layer, and the field-of-view information of the video images of layers (enhanced layers) other than the video image of the specific layer. Note that, as will be discussed later, offset information is information specifying a relative position of the video image of an enhanced layer to the video image of the base layer. Specifically, the field-of-view information extraction unit 105 extracts this information from a SPS (Sequence Parameter Set) of the video image ES. Further, the field-of-view information extraction unit 105 extracts a layer identifier "dependency_id" from an AU (Access Unit). The field-of-view information extraction unit 105 outputs the extracted field-of-view information of the base layer, field-of-view offset information of the enhanced layer, and layer identifier to a field-of-view difference determination unit 106.

The field-of-view difference determination unit 106 calculates field-of-view information for the enhanced layer, based on the field-of-view information of the base layer, field-ofview offset information of the enhanced layer and layer identifier input from the field-of-view information extraction unit 105, and determines the size of the field of view of each layer.

The field-of-view difference determination unit 106, in the case where the ratio of the field of view of the layer to the field of view of the layer having the widest field of view is less than or equal to a predetermined threshold value, outputs the field-of-view information of the base layer, field-of-view offset information of the enhanced layer and layer identifier to a field-of-view position determination unit 107. Further, the field-of-view difference determination unit 106 outputs the identifier of the layer having the widest field of view to the video image decoding unit 109. In this way, the field-of-view difference determination unit 106 discriminates a layer (layer having a narrow field of view) whose ratio to the field of view of the layer having the widest field of view among the layers is less than or equal to a threshold value, and indicates this layer to the field-of-view position determination unit 107. The range of layers (fields of view), among the plurality of layers, to be assigned a chapter depending on the moved distance can be changed by the threshold value setting.

The field-of-view position determination unit 107 sequentially calculates the center position of the video image of a layer having a narrow field of view whose ratio to the field of view of the layer having the widest field of view is less than or equal to a threshold value, based on the field-of-view information of the base layer, field-of-view offset information of the enhanced layer, and identifier of the layer having the widest field of view input from the field-of-view difference determination unit 106. If the moved distance of the center of the layer having a narrow field of view from the sequentially calculated center position over a fixed period is greater than or equal to a predetermined threshold value, the field-of-view position determination unit 107 judges that the scene of the video image of the layer having a narrow field of view has changed. The field-of-view position determination unit 107 then outputs the identifier of the layer having a narrow field of view and time information to the narrow-field-of-view chapter information creation unit 108. This time information is, for example, time information corresponding to the video image frame whose center position was most recently calculated.

The narrow-field-of-view chapter information creation unit 108 creates, from the identifier of the layer having a narrow field of view and time information input from the field-of-view position determination unit 107, a chapter information table in which the time information is associated with the layer identifier, and saves the created chapter information table to the recording unit 103.

The video image decoding unit 109 performs decoding on the layer having the widest field of view, based on the video image ES input from the signal demultiplexer 104 and the identifier of the layer having the widest field of view input from the field-of-view difference determination unit 106, and creates video image data. The video image decoding unit 109 then outputs the video image data to an external device such as a display device, for example, and to a video image analysis unit 110.

The video image analysis unit 110 uses a conventional video image change amount identification technique to analyze the video image data input from the video image decoding unit 109, detects that a video image has changed in the case where, for example, the size of the difference between frames is greater than or equal to a threshold value, and outputs time information to the common chapter information creation unit 111. The processing in which the video image analysis unit 110 determines a change in a video image may be performed on each frame of the video image or, may be performed every few frames.

The common chapter information creation unit 111 creates a chapter information table in which the time information input from the video image analysis unit 110 is associated with the layer identifiers of the layer having the widest field of view and the layer having a narrow field of view. The common chapter information creation unit saves the created chapter information table to the recording unit 103. Note that the common chapter information creation unit 111 may create a chapter information table in which the time information input from the video image analysis unit 110 is associated with all of the layer identifiers.

The audio decoding unit 112 decodes the audio ES input from the signal demultiplexer 104 to create audio data, and outputs the audio data to a speaker.

Figure 2:
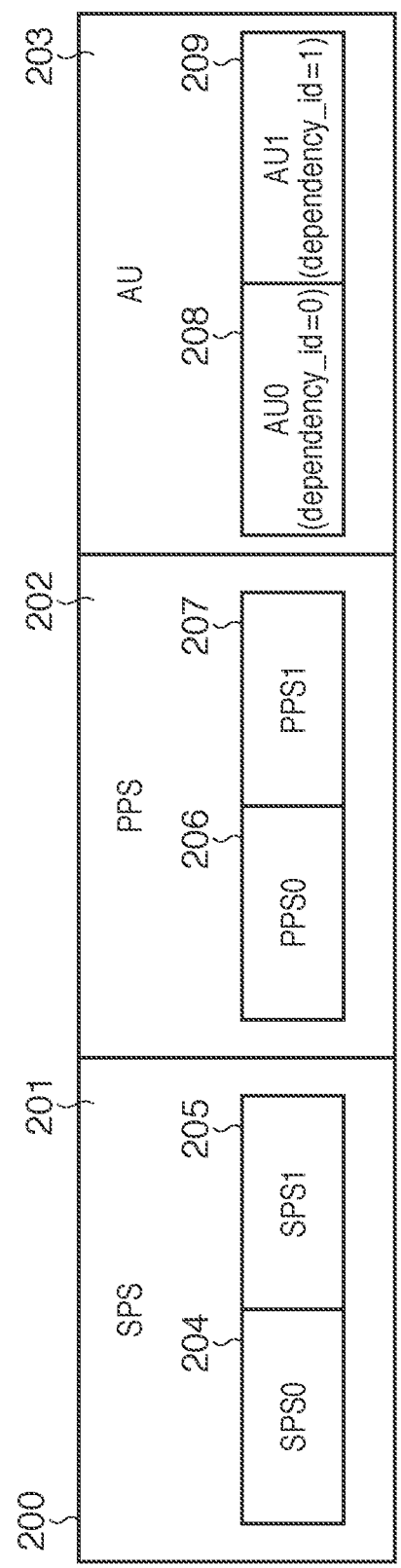
FIG. 2 shows an example configuration of an H.264/SVC video image data stream usable in the present invention.

The configuration of a video image data stream 200 encoded with H.264/SVC used in the present embodiment will be described with reference to FIG. 2. Here, the video image data stream 200 is assumed to be hierarchically encoded into two layers consisting of a base layer and a single enhanced layer. In the video image data stream 200, a SPS (Sequence Parameter Set) 201 is a header that includes information relating to encoding of an entire sequence containing a plurality of pictures. Also, a PPS (Picture Parameter Set) 202 is a header that includes encoding information relating to all of the pictures. An AU (Access Unit) 203 contains a plurality of slice data.

Slice data is one of the units of data called a NAL (Network Abstraction Layer) unit that contains the encoded data of slices. An extension header called a prefix NAL unit is appended as a header of the slice data, and contains a dependency_id, which is information that serves as a layer identifier. Layers can be selected by referring to the dependency_id. The SPS 201 stores information relating to the vertical and horizontal fields of view of video images encoded in those layers. An SPS0 204 of the base layer stores information relating to the vertical and horizontal field of view of the video image of the base layer. A SPS1 205 of the enhanced layer stores offset information relating to the difference of the vertical and horizontal field of view relative to the video image of the base layer. The information included in the SPS 201 will be discussed in detail later.

An example configuration of video image content encoded in the video image data stream 200 of the present embodiment will be described with reference to FIG. 3. As mentioned above, the video image content used in the present embodiment is hierarchically encoded into two layers consisting of a base layer and a single enhanced layer. The base layer and the enhanced layer have different fields of view as well as different resolutions, the base layer having SD resolution and the enhanced layer having 4K2K resolution. Specifically, a video image 302 of the enhanced layer is a full-frame video image including a person 303, a person 304 and person 305, and a video image 301 of the base layer is a close-up video image of the face of the person 303. Accordingly, the enhanced layer is the layer having the widest field of view. Also, the ratio of the field of view of the base layer to the field of view of the enhanced layer is assumed to be less than or equal to a threshold value. Accordingly, the base layer is the layer having a narrow field of view. Also, the video image having a narrow field of view is part of the region of the video image having the widest field of view, and is in an inclusion relation with the video image having the widest field of view.

Figure 4:
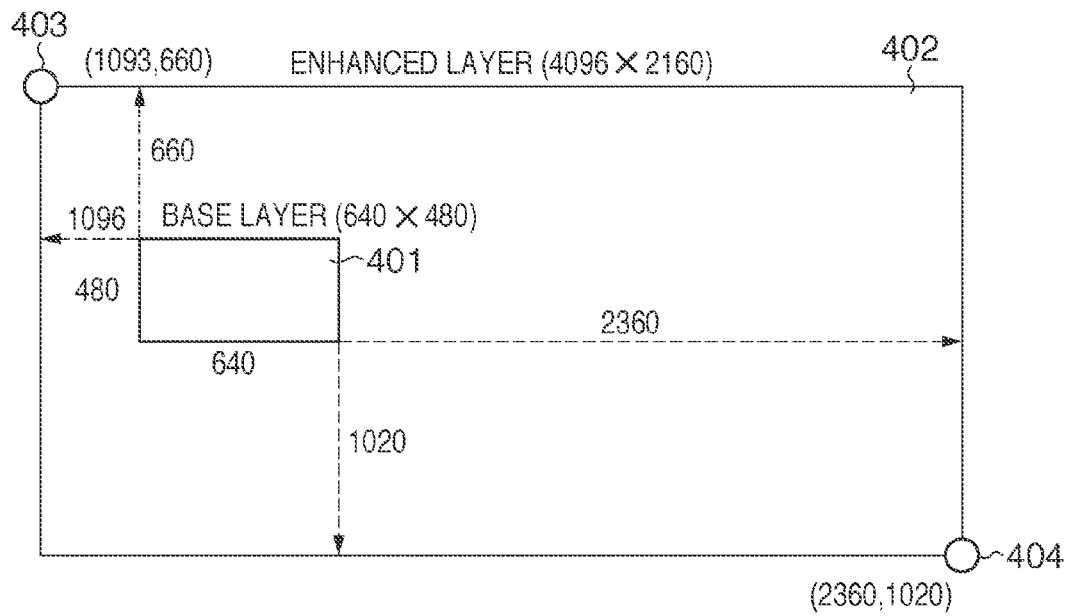
FIG. 4 shows a specific example of field-of-view information in the embodiment of the present invention.

Information relating to the field of view of each layer when such video image content has been hierarchically encoded will be described with reference to FIG. 4. Here, the vertical and horizontal size of the video image of each layer (number of pixels, macroblocks, etc.) corresponds respectively to the vertical and horizontal field of view, and can be used as information relating to the field of view. Also, since the video images of the layers do not necessarily have common aspect ratios, the total number of pixels or macroblocks included in the video image of each layer is used as the size of the field of view of that video image, in the case of comparing the size of the fields of view of the layers.

In the following description, the size of a video image is assumed to be represented by the number of pixels. In this case, a video image 401 of the base layer has a horizontal size BH of 640 and a vertical size VH of 480. Also, the field-of-view offset information of a video image 402 of the enhanced layer is assumed to be represented by a combination of the differences in position of the upper left corner and the lower right corner of the video image 402 of the enhanced layer relative to the video image 401 of the base layer. The offset information in the video image configuration of FIG. 3, when represented by the number of pixels, is such that offset information 403 (LH,LV) of the upper left corner is (1096,660) and offset information 404 (RH,RV) of the lower right corner is (2360,1020). Note that LH,RH is the horizontal offset and LV,RV is the vertical offset. The offsets are assumed to be positive values taken outwardly from the edge of the base layer. Accordingly, a negative value for any of LH, LV, RH or RV indicates that the enhanced layer has the narrower field of view, without needing to compare sizes. Also, in the case where the video image of the layer having a narrow field of view is part of the video image of the layer having the widest field of view, as in the present embodiment, it can be determined that an enhanced layer whose offset information includes a negative value has a narrower field of view than the base layer.

Figure 5:
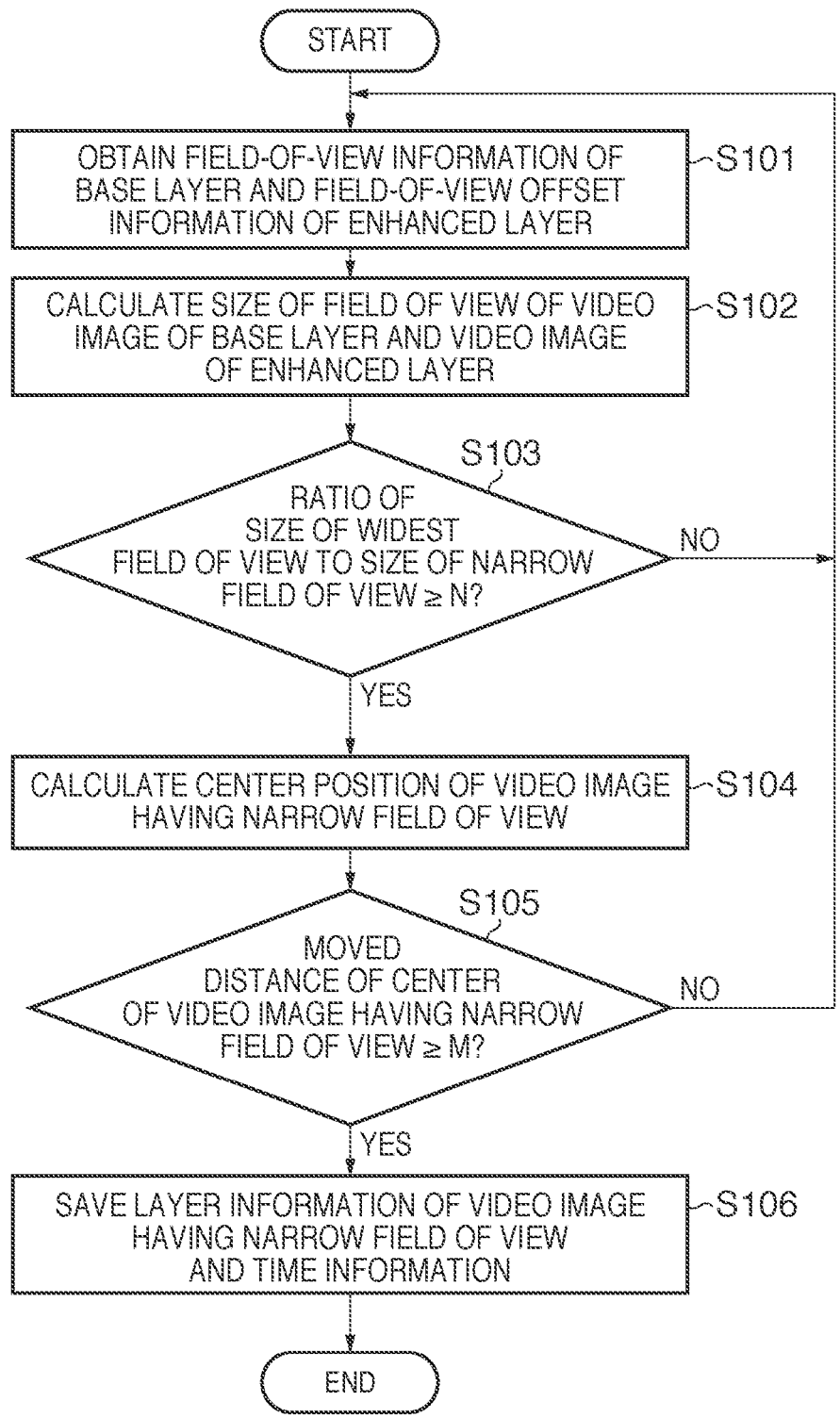
FIG. 5 is a flowchart illustrating an operation for creating chapter information for a video image having a narrow field of view in the chapter information creation apparatus of the embodiment of the present invention.

The operation for creating chapter information for a video image having a narrow field of view performed in the chapter information creation apparatus of the present embodiment will be described using the flowchart of FIG. 5.

In S101, the field-of-view information extraction unit 105 receives a video image ES from the signal demultiplexer 104, and extracts the layer identifier dependency_id included in an AU. Also, the field-of-view information extraction unit 105 extracts the field-of-view information (BH,BV)=(640,480) of the base layer and the field-of-view offset information (LH, LV)=(1096,660), (RH,RV)=(2360,1020) of the enhanced layer from the SPS 201 of the video image ES. The field-of-view information extraction unit 105 then outputs the extracted field-of-view information of the base layer, field-of-view offset information of the enhanced layer and layer identifier to the field-of-view difference determination unit 106.

In S102, the field-of-view difference determination unit 106 derives, as the size of the field of view, the video image size of each enhanced layer from the field-of-view information of the base layer, field-of-view offset information of each enhanced layer and layer identifier received from the field-of-view information extraction unit 105. Here, the size of the field of view is derived as the number of vertical pixels multiplied by the number of horizontal pixels, since the size of a video image is given in units of pixels. The field-of-view difference determination unit 106 then discriminates the layer having the widest field of view from the vertical and horizontal size of the video image of the base layer and the vertical and horizontal size of the video image of each enhanced layer.

Figure 3:
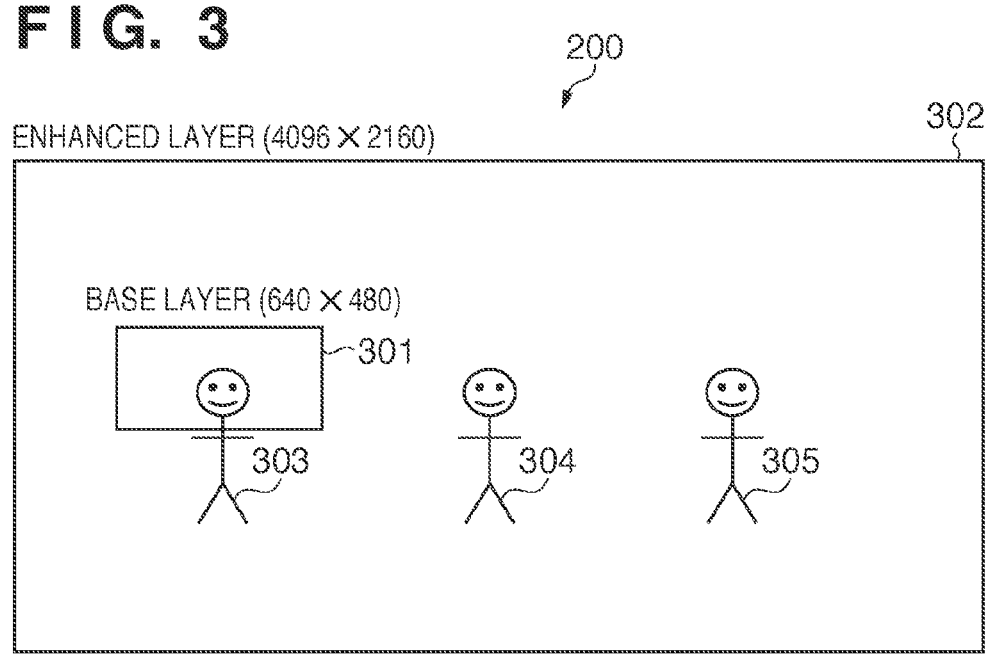
FIG. 3 shows an example configuration of hierarchically-encoded video images having different fields of view.

In the case where the video image of a layer having a narrow field of view is part of the video image of the layer having the widest field of view such as in the example in FIG. 3, the video image of an enhanced layer having positive offset information will have a wider field of view than the video image of the base layer. Similarly, the video image of an enhanced layer having negative offset information will have a narrower field of view than the video image of the base layer.

With the video images of the example in FIG. 3, since the offset information is positive, and there is only the base layer and the one enhanced layer, the field-of-view difference determination unit 106 judges that the enhanced layer is the layer that has the wide field of view (widest field of view).

Also, the field-of-view difference determination unit 106 calculates the horizontal size (EH=BH+LH+RH) and the vertical size (EV=BV+LV+RV) of the enhanced layer. In the example in FIG. 3, (EH,EV)=(4096,2160). The field-of-view difference determination unit 106 then respectively derives BH×BV as the field of view of the video image of the base layer and EH×EV as the field of view (widest field of view) of the video image of the enhanced layer.

In S103, the field-of-view difference determination unit 106 detects a video image having a narrow field of view whose ratio to the video image having the widest field of view is less than or equal to a threshold value, from the size of the field of view of the base layer and the widest field of view derived at S102. Specifically, the field-of-view difference determination unit 106 discriminates whether the ratio of the widest field of view to the field of view of the base layer is greater than or equal to N. The field-of-view difference determination unit 106 then advances the processing to S104 if the ratio is greater than or equal to N, and returns the processing to S101 if the ratio is less than N. Alternatively, the field-of-view difference determination unit 106 may discriminate whether the ratio of the field of view of the base layer to the widest field of view is less than or equal to N. In the present embodiment, the field-of-view difference determination unit 106 determines whether the size ratio is greater than or equal to 2, where N is 2, but the value of N may be appropriately set according to conditions, such that N increases the greater the processing capacity of the device, for instance. In the present embodiment, the field-of-view ratio is greater than or equal to 2, given that the ratio of the widest field of view to the field of view of the base layer is (4096×2160)/(640×480)=28.8, thus the base layer is the layer having a narrow field of view.

In S104, the field-of-view position determination unit 107 derives the center position of the video image of the layer having a narrow field of view from the field-of-view information of the base layer and the field-of-view offset information of the enhanced layer. Specifically, the field-of-view position determination unit 107 places the video image of the layer having a narrow field of view in a XY coordinate system whose origin is the lower left point of the video image of the layer having the wide field of view, and derives the center position of the video image of the layer having a narrow field of view. When the coordinates of the center position is given as (X1,Y1), X1 and Y1 can be derived as |LH|+BH/2 and |RV|+BV/2, respectively. In the present embodiment, (X1,Y1)=(1416,1250).

In S105, the field-of-view position determination unit 107 calculates, for the same layer having a narrow field of view, the moved distance between the center coordinates (X0,Y0) of the video image calculated from information in the previous SPS and the center coordinates (X1,Y1) calculated from information in the current SPS, and judges whether the moved distance is greater than or equal to M. Specifically, the field-of-view position determination unit 107 judges whether $(X1-X0)^2+(Y1-Y0)^2 \geq M^2$ holds.

Note that the moved distance calculation can be performed periodically, and may, for example, be performed on each frame of the video image of a layer having a narrow field of view or every few frames. Accordingly, the moved distance derived at S105 corresponds to the moved distance over a predetermined fixed period.

If the moved distance of the center coordinates is greater than or equal to M, the field-of-view position determination unit 107 transmits the layer identifier dependency_id of the layer having a narrow field of view and the current playback time to the narrow-field-of-view chapter information creation unit 108, and advance the processing to S106. Here, the transmitted current playback time corresponds to chapter information for the video image of the layer having a narrow field of view. On the other hand, if the moved distance of the center coordinates is judged to be less than M, the field-of-view position determination unit 107 returns the processing to S101. In the present embodiment, the horizontal size of a video image having a narrow field of view is taken as the value of M, but the value of M can be appropriately set.

In S106, the narrow-field-of-view chapter information creation unit 108 creates a chapter information table in which the current playback time is associated with the identifier dependency_id of the layer having a narrow field of view received from the field-of-view position determination unit 107, and the chapter information table is recorded to the recording unit 103.

Figure 6:
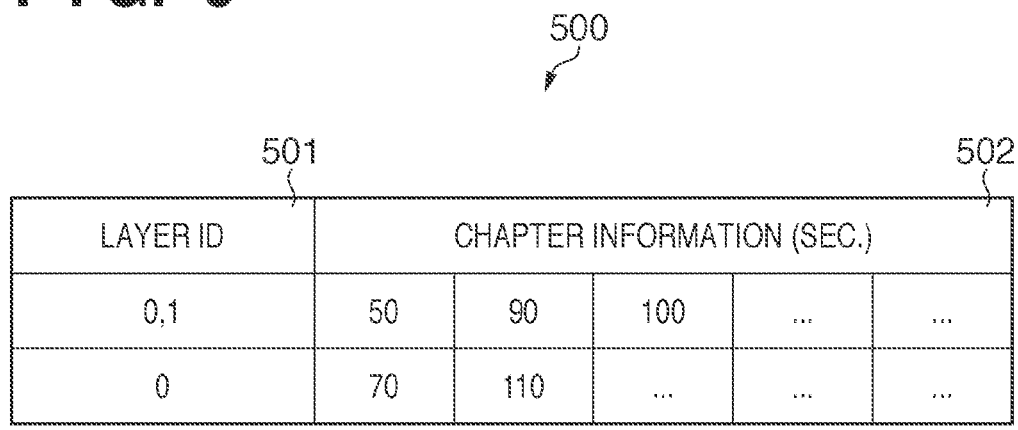
FIG. 6 shows an example chapter information table created by the chapter information creation device of the embodiment of the present invention.

Here, a chapter information table 500 created by the narrow-field-of-view chapter information creation unit 108 will be described with reference to FIG. 6.

The chapter information table 500 records layer identifiers and chapter times in association with one another, and manages the chapter information of the video image content. The identifiers of layers to which corresponding chapter information (chapter times) is applied are recorded in a layer identifier field 501. Accordingly, if the chapter information is common to all of the layers, the layer identifiers dependency_id of all of the layers included in the video image ES are recorded in the layer identifier field 501. Also, with regard to chapter information that is only applied to the video image of specific layers, only the layer identifier of those layers is recorded in the layer identifier field 501. As for chapter information in a chapter time field 502, times representing the beginnings of chapters are recorded as elapsed times from the beginning of the video image content.

Figure 7:
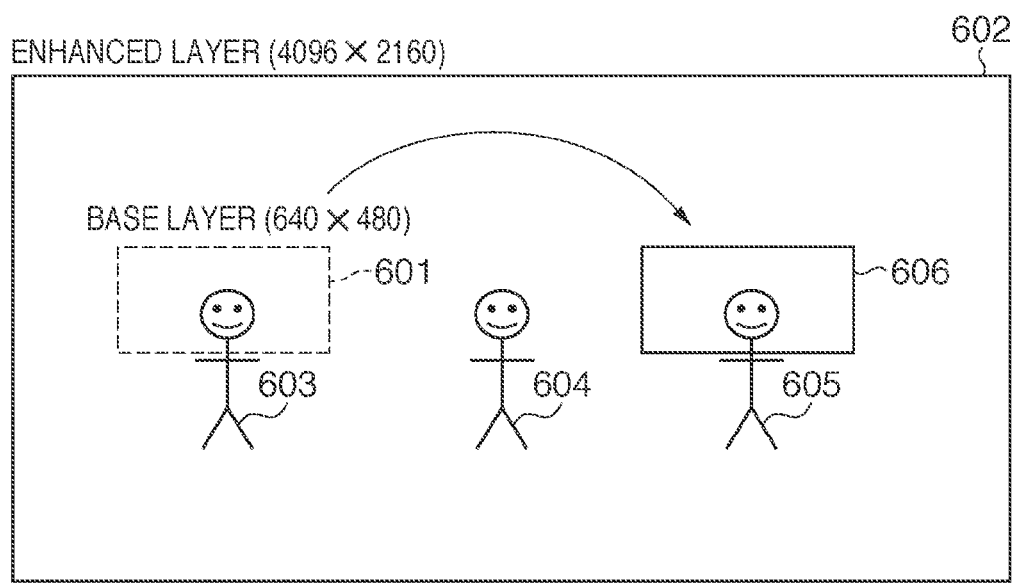
FIG. 7 illustrates an example change in a video image having a narrow field of view.

Here, an example state of a video image for which common chapter information and narrow-field-of-view chapter information are created will be described with reference to FIG. 7. Common chapter information is created when the content of a video image has changed greatly (the scene has changed) in a plurality of layers.

In the case where a video image 602 of the layer having the widest field of view has changed greatly, chapter information common to at least layers having a narrow field of view is created, assuming that the video images of layers having a narrow field of view have also changed. Alternatively, chapter information common to all of the layers may be created. Chapter information for the layer having the widest field of view is created using a conventional video image change amount identification technique, for example, and involves analyzing the video image 602 of the layer having the widest field of view, and generating chapter information when a large change in the video image is detected. For example, chapter information can be created after detecting a change in the video image in the case where the size of the difference between frames is greater than or equal to a threshold value. The processing in which the video image analysis unit 110 determines a change in a video image may be performed on each frame of the video image or may be performed every few frames. Note that with regard to a layer for which the ratio of the field of view of the layer having the widest field of view to the field of view of the layer is less than a fixed value, common chapter information may be created similarly to the layer having the widest field of view, or chapter information may not be created for that layer.

On the other hand, as mentioned above, chapter information for a video image having a narrow field of view is created when the moved distance is greater than or equal to a threshold value, such as in the case where the position of the video image having a narrow field of view moves from 601 to 606, for example.

According to the present embodiment, chapter information is created for the video image of the layer having the widest field of view, based on the analysis of the video image, out of video image data obtained by hierarchically encoding a plurality of video images having different fields of view. Also, with regard to the video image of a layer having a narrow field of view, chapter information is created based on the moved distance over a fixed period rather than by analyzing the video image, in addition to the same chapter information as the layer having the widest field of view. Thus, it becomes possible to generate chapter information for the video image of each layer, while at the same time greatly reducing the processing load in comparison to the case where video images are analyzed for each individual encoded layer.

OTHER EMBODIMENTS

In the abovementioned embodiment, an example was described in which the present invention is applied to video image data hierarchically encoded into two layers of which the enhanced layer had the widest field of view. However, the base layer may have the widest field of view. In this case, the base layer can be judged to have a wider field of view than the enhanced layer, having confirmed that value of the field-of-view offset information of the enhanced layer is negative in the abovementioned field-of-view determination of S102, for example. The field of view of the video image of the enhanced layer can be derived as EH×EV, and the field of view of the video image of the layer having the wide field of view can be derived as BH×BV.

Also, in the abovementioned embodiment, an example was described in which there was a single enhanced layer, but the present invention can be similarly applied in the case where a plurality of enhanced layers are included. In this case, comparison of the field of view of the video image of a layer having a narrow field of view with the video image of the layer having the widest field of view can be repeatedly performed for the number of layers other than the layer having the widest field of view.

Further, in the present embodiment, field-of-view offset information of the enhanced layer in an SPS was used, but the field-of-view offset information of the enhanced layer may be acquired from the slice header in which encoding information relating to each slice in the video image stream data is stored.

Also, the moved distance of the center position of a video image over a fixed period was used as the judgment criterion of a scene change of the video image of a layer having a narrow field of view, but any coordinates may be used as long as the moved distance of the video image of a layer having a narrow field of view can be derived. For example, the coordinates of any of the four corners may be used.

Also, in the case where the image quality, and in particular the spatial resolution, of video images differs between layers, the sizes of the fields of view can be compared after converting the spatial resolutions of the various layers into the same spatial resolution.

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-063244, filed on Mar. 18, 2010, which is hereby incorporated by reference herein in its entirety.

What is claimed is:

1. A chapter information creation apparatus for creating, from video image data obtained by hierarchically encoding a plurality of video images including a video image having an arbitrary field of view and a video image having a field of view corresponding to a region included in the arbitrary field of view, chapter information for each of the plurality of video images, comprising:
    determination unit adapted to determine, from information relating to the fields of view of the plurality of video images and included in the video image data, a first video image having a widest field of view from among the plurality of video images included in the video image data;
    detection unit adapted to detect, from information relating to the fields of view of the plurality of video images and included in the video image data, a second video image having a field of view whose ratio to a size of the field of view of the first video image is less than or equal to a threshold value from among the video images included in the video image data;
    computation unit adapted to periodically calculate a position of the second video image in a region included in the field of view of the first video image;
    first creation unit adapted to calculate, from the position periodically calculated by the computation unit with respect to the second video image, a moved distance of the position over a fixed period, and create chapter information for the second video image if the moved distance is greater than or equal to a predetermined threshold; and
    second creation unit adapted to analyze the first video image, and create chapter information for the first video image and the second video image in response to a change in the first video image being detected.

2. The chapter information creation apparatus according to claim 1, wherein the information relating to the fields of view of the plurality of video images includes information showing a size of one specific video image of the plurality of video images and offset information specifying a position, relative to the one specific video image, of a video image other than the one specific video image.

3. The chapter information creation apparatus according to claim 1, wherein the computation unit calculates, as the position of the second video image, coordinates of a center position of the second video image.

4. A computer-readable non-transitory recording medium storing a program for causing a computer to function as the units of the chapter information creation apparatus according to claim 1.

5. A control method for a chapter information creation apparatus that creates, from video image data obtained by hierarchically encoding a plurality of video images including a video image having an arbitrary field of view and a video image having a field of view corresponding to a region included in the arbitrary field of view, chapter information for each of the plurality of video images, comprising:
    a determination step of determining, from information relating to the fields of view of the plurality of video images and included in the video image data, a first video image having a widest field of view from among the plurality of video images included in the video image data;
    a detection step of detecting, from information relating to the fields of view of the plurality of video images and included in the video image data, a second video image having a field of view whose ratio to a size of the field of view of the first video image is less than or equal to a threshold value from among the plurality of video images included in the video image data;
    a computation step of periodically calculating a position of the second video image in a region included in the field of view of the first video image;
    a first creation step of calculating, from the position periodically calculated in the computation step with respect to the second video image, a moved distance of the position over a fixed period, and creating chapter information for the second video image if the moved distance is greater than or equal to a predetermined threshold; and
    a second creation step of analyzing the first video image, and creating chapter information for the first video image and the second video image in response to a change in the first video image being detected.

6. An image processing apparatus comprising:
    acquisition unit configured to acquire image data of a plurality of images including a first image and a second image which corresponds to a partial region in the first image;
    output unit configured to output the second image acquired by the acquisition unit, to a recording apparatus, wherein the second image is to be recorded in a recording medium by the recording apparatus;
    detection unit configured to detect a moving amount of the second image based on a position of the second image in the first image; and
    creation unit configured to create, based on the moving amount detected by the detection unit, predetermined information for searching for the second image recorded in the recording medium,
    wherein said creation unit creates the predetermined information for searching for the second image if a ratio of a size of the second image to a size of the first image is less than or equal to a predetermined ratio and does not create the predetermined information for searching for the second image if the ratio is larger than the predetermined ratio.

7. The apparatus according to claim 6, wherein said creation unit creates the predetermined information for searching for the second image if the moving amount is greater than or equal to a predetermined amount.

8. The apparatus according to claim 6, wherein said detection unit detects the position of the second image for each frame of the first image.

9. The apparatus according to claim 6, wherein said detection unit detects the position of the second image for every few frames of the first image.

10. The apparatus according to claim 6, wherein said detection unit detects a center coordinate of the second image as the position.

11. The apparatus according to claim 10, wherein said detection unit detects the center coordinate of the second image based on information specifying a size of the first image and information specifying a relative position of the second image to the first image.

12. A non-transitory computer readable recording medium that stores a program causing, when executed, a computer to perform as the image processing apparatus according to claim 6.

13. An image processing apparatus, comprising:
acquisition unit configured to acquire image data of a plurality of images including an image and a partial image in the image;
output unit configured to output the partial image acquired by the acquisition unit, to a recording apparatus, wherein the partial image is to be recorded in a recording medium by the recording apparatus; and
creation unit configured to create predetermined information for searching for the partial image recorded in the recording medium on a basis of the position of the partial image in the image,
wherein said creation unit creates the predetermined information for searching for the partial image if a ratio of a size of the partial image to a size of the image is less than or equal to a predetermined ratio and does not create the predetermined information for searching for the partial image if the ratio is larger than the predetermined ratio.

14. The apparatus according to claim 13, further comprising:
detection unit configured to detect amount of a positional change of the partial image between frames, and wherein
said creation unit creates the predetermined information searching for the partial image on the basis of the detected amount of the positional change.

15. The apparatus according to claim 14, wherein said creation unit creates the predetermined information searching for the partial image if the detected amount of the positional change is equal to or larger than a predetermined amount.

16. The apparatus according to claim 14, wherein the amount of the positional change is a moved distance of the partial image between the frames.

17. The apparatus according to claim 13, wherein said detection unit detects the position of the partial image for each frame of the image.

18. The apparatus according to claim 13, wherein said detection unit detects the position of the partial image for every few frames of the image.

19. The apparatus according to claim 13, wherein said detection unit detects a center coordinate of the partial image as the position.

20. The apparatus according to claim 19, wherein said detection unit detects the center coordinate of the partial image based on information specifying a size of the image and information specifying a relative position of the partial image to the image.

21. A non-transitory computer readable recording medium that stores a program causing, when executed, a computer to perform as the image processing apparatus according to claim 13.

22. A control method for an image processing comprising:
an acquisition step of acquiring image data of a plurality of images including a first image and a second image which corresponds to a partial region in the first image;
an output step of outputting the second image acquired in the acquisition step, to a recording apparatus, wherein the second image is to be recorded in a recording medium by the recording apparatus;
a detection step of detecting a moving amount of the second image based on a position of the second image in the first image; and
a creation step of creating, based on the moving amount detected in the detection step, predetermined information for searching for the second image recorded in the recording medium,
wherein said creation step creates the predetermined information for searching for the second image if a ratio of a size of the second image to a size of the first image is less than or equal to a predetermined ratio and does not create the predetermined information for searching for the second image if the ratio is larger than the predetermined ratio.

23. A control method for an image processing apparatus, the control method comprising:
an acquisition step of acquiring image data of a plurality of images including an image and a partial image in the image;
an output step of outputting the partial image acquired in the acquisition unit, to a recording apparatus, wherein the partial image is to be recorded in a recording medium by the recording apparatus; and
a creation step of creating the predetermined information for searching for the partial image recorded in the recording medium on the basis of a position of the partial image in the image,
wherein said creation step creates the predetermined information for searching for the partial image if a ratio of a size of the partial image to a size of the image is less than or equal to a predetermined ratio and does not create the predetermined information for searching for the partial image if the ratio is larger than the predetermined ratio.

* * * * *